United States Patent [19]

McGeehan et al.

[11] Patent Number: 4,679,243
[45] Date of Patent: Jul. 7, 1987

[54] DATA TRANSMISSION USING A TRANSPARENT TONE-IN BAND SYSTEM

[75] Inventors: Joseph P. McGeehan, Corsham; Andrew Bateman, Bath, both of England

[73] Assignee: National Research Development Corporation, London, England

[21] Appl. No.: 764,984

[22] Filed: Aug. 12, 1985

Related U.S. Application Data

[63] Continuation-in-part of Ser. No. 617,733, Jun. 6, 1984.

[30] Foreign Application Priority Data

Aug. 17, 1984 [GB] United Kingdom ............... 8421025

[51] Int. Cl.[4] .......................................... H04B 1/68
[52] U.S. Cl. ................................. 455/47; 370/111; 455/71; 455/118; 455/257; 455/260
[58] Field of Search ............... 370/101, 110.4, 111, 370/110, 110.1; 178/22.01; 179/1.5 R, 1.5 FS, 1.5 E; 455/26, 46, 47, 59, 71, 118, 48, 67, 68, 70, 257, 259, 260; 375/43, 97, 41, 37, 38, 59; 329/50

[56] References Cited

U.S. PATENT DOCUMENTS

| | | | |
|---|---|---|---|
| 3,492,429 | 1/1970 | Schroeder | 370/111 |
| 3,586,781 | 6/1971 | Jones | 370/111 |
| 3,684,838 | 8/1972 | Kahn | 455/47 |
| 3,969,675 | 7/1976 | Gosling | 455/71 |

FOREIGN PATENT DOCUMENTS

2028064  2/1980  United Kingdom ............... 455/71

OTHER PUBLICATIONS

The Use of Transparent Tone—in—Band and Feedforward Signal Regeneration in Single Sideband Mobile Communication Systems—J. P. McGeehan, et al, pp. 121-126, 1982: IEEE Conference on Communications Equipment Systems, 1982.

Phase—Locked Transparent Tone—in—Band—J. P. McGeehan, et al; Jan. 1984, pp. 81-87: IEEE Transactions on Communications, vol. COM—32; No. 1.

*Primary Examiner*—Benedict V. Safourek
*Attorney, Agent, or Firm*—Cushman, Darby & Cushman

[57] ABSTRACT

When modems are used in SSB systems a problem arises in controlling variable data rates. If a transparent tone-in band system is used, the notch in the band transmitted will be required for a control signal for the SSB receiver. The present invention allows a further possibility for transmitting control signals, for instance one representative of data rate, by varying the width of the notch in the transmitter and determining notch width in the receiver. The notch width is controlled by frequencies applied to two mixers and reference signals for these mixers are derived by respective multipliers from a clock signal. In a receiver the process of restoring the original frequency spectrum also employs two mixers receiving signals from two oscillators. The frequency of one of the oscillators is controlled to ensure that lower and upper portions of the restored spectrum have the correct frequency and phase relationship. The width of the notch is determined by mixing the frequencies of the oscillators in the receiver, using a filter to select one side band, and a multiplier.

20 Claims, 7 Drawing Figures

DATA TRANSMISSION USING A TRANSPARENT TONE-IN BAND SYSTEM

This is a continuation-in-part of McGeehan et al, Ser. No. 617,733, filed June 6, 1984.

The present invention relates to the provision of facilities for improved date transmission using transparent tone-in-band (TTIB) systems.

TTIB systems are described by J. P. McGeehan, A. J. Bateman and D. F. Burrows in "The Use of 'Transparent' Tone-In-Band (TTIB) and Feedforward Signal Regeneration (FFSR) In Single Sideband Mobile Communication Systems", IEE Conference on Communications Equipment and Systems 82, pages 121 to 126, 1982. In a TTIB system the spectrum of a baseband signal, for example from 300 Hz to 3 kHz, is split into two segments, for instance from 300 Hz to 1.7 kHz and 1.7 kHz to 3 kHz. The upper frequency band is translated upward in frequency by an amount equal to the width of an intervening "notch" and added to the lower frequency band. If for example the required "notch" width or band separation is 1.2 kHz the circuit output will comprise a signal extending from 300 kHz to 1.7 kHz and from 2.9 to 4.2 kHz. A low level reference tone may then be added within the resulting notch for example at 2.3 kHz and the composite signal is then transmitted using conventional techniques, such as single sideband (SSB), with the pilot tone in the notch acting as the reference for subsequent pilot-based processing. In the receiver, the final stages of audio processing remove the pilot in the usual way (for use in, for example automatic gain control and automatic frequency control purposes) and perform a complementary downwards frequency translation of the upper half of the spectrum thereby regenerating the original 300 Hz to 3 kHz baseband signal. This TTIB gives a complete transparent channel from the baseband input of the transmitter to the baseband receiver output avoiding the disadvantage of removing a section of the band in order to insert the pilot tone but obtaining the advantages of high degree of adjacent channel protection, good correlation between fades on the pilot tone and fades on the audio signal, and a large symmetrical pull-in range for the frequency control to operate.

According to the present invention there is provided a communication system comprising a transmitter including means for dividing a band of interest in the frequency spectrum into upper and lower portions with a frequency notch between the said portions by a process which includes frequency translating at least part of the said band which corresponds to one of the said portions, including control means responsive to a control input signal to vary the width of the notch, and a receiver comprising a receiver processor for restoring the original frequency spectrum, the receiver processor including means for providing an output signal representative of the width of the notch.

The invention includes transmitters for the above system, receivers for the said system and methods of communication corresponding to the said system.

A system according to the invention has the advantage of providing an additional possibility, the notch width, for the transmission of information. Such information may be used for many purposes, for example for controlling data rate in a receiver when the transmission rate varies. Many modems operate at variable data rates and even when rates are constant and nominally the same in modems of the same type, they vary in practice from modem to modem.

Thus where the means in the transmitter for dividing the band employs one or two mixers, the frequencies supplied to the mixers to provide the notch are controlled in accordance with the data rate. In the receiver signals from the mixer or mixers which restore the position of the translated portion of the frequency spectrum indicate the notch width.

Where variable data rate and coherent detection are required, for example in phase shift keying (PSK), the receiver may include a feedforward signal regeneration (FFSR) circuit which receives a signal dependent on notch width, a signal of the same frequency being injected by the transmitter into the notch.

Previous systems require that the data carrier signal and the signal injected into the notch are at the same frequency for coherent detection, a restriction impossible to fulfil where several carriers are used, but by using the FFSR circuit, the restriction no longer applies. Thus the system of the invention allows PSK to be used even in fading conditions such as are encountered in mobile radio because both satisfactory fading suppression and coherent demodulation together with the facility to generate multiple carriers from a multiple of the notch width are available. Thus the invention has an important advantage since for example coherent PSK has an error performance which is superior both to differential phase shift keying (DPSK) and frequency shift keying (FSK) except under fading where coherent demodulation could not previously be reliably carried out.

Certain embodiments of the invention will now be described by way of example, with reference to the accompanying drawings, in which.

Figure 3:
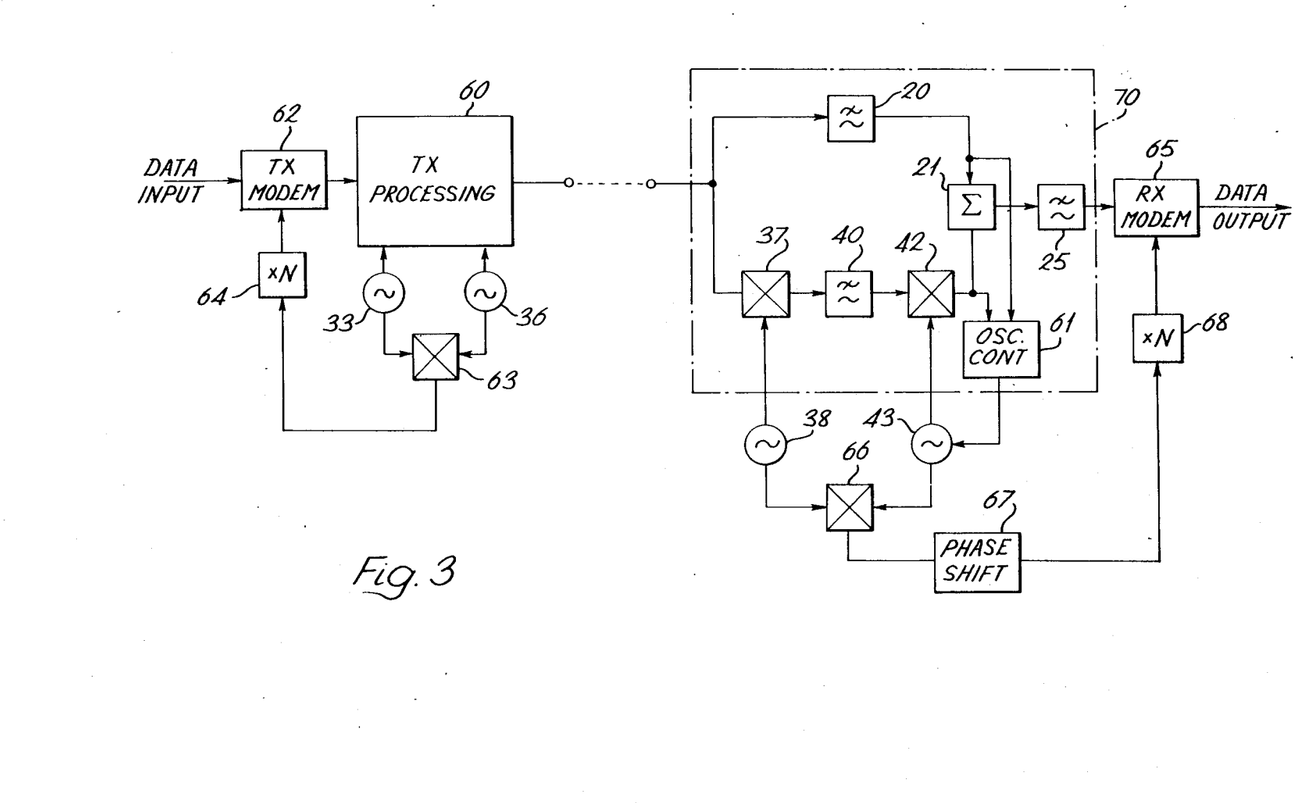
FIG. 3 is a block diagram of a TTIB system providing bit synchronisation.
Figure 4:
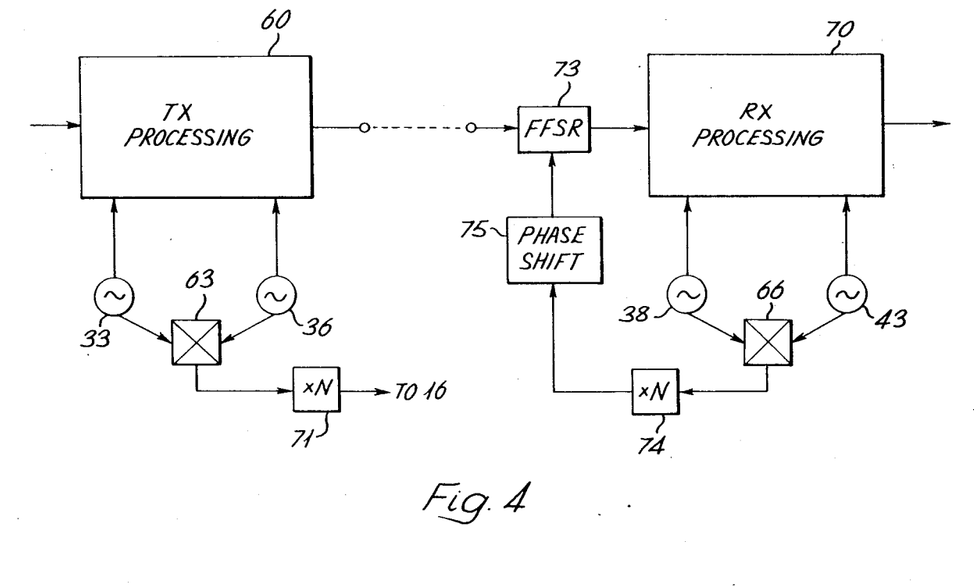
FIG. 4 is a block diagram of a TTIB system employing FFSR for example and phase correction and for coherent demodulation.
Figure 5:
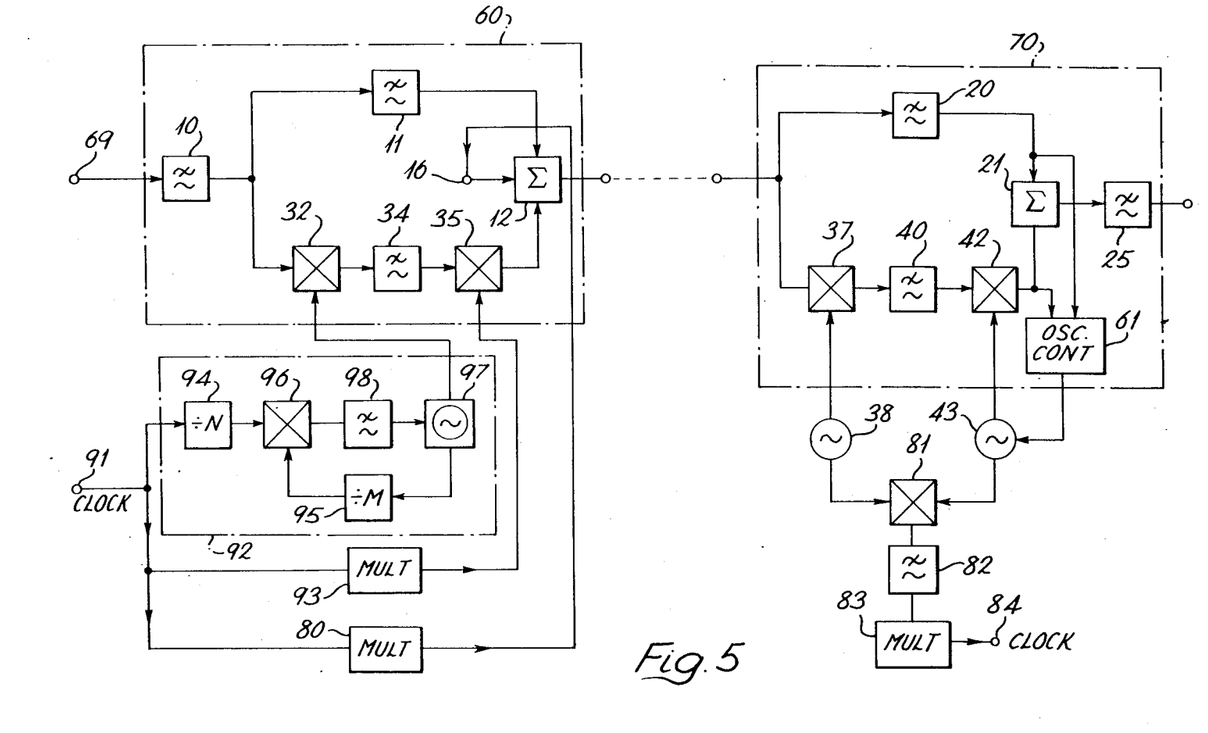
FIG. 5 is a block diagram of a variable data rate TTIB system according to the invention.
Figure 6:
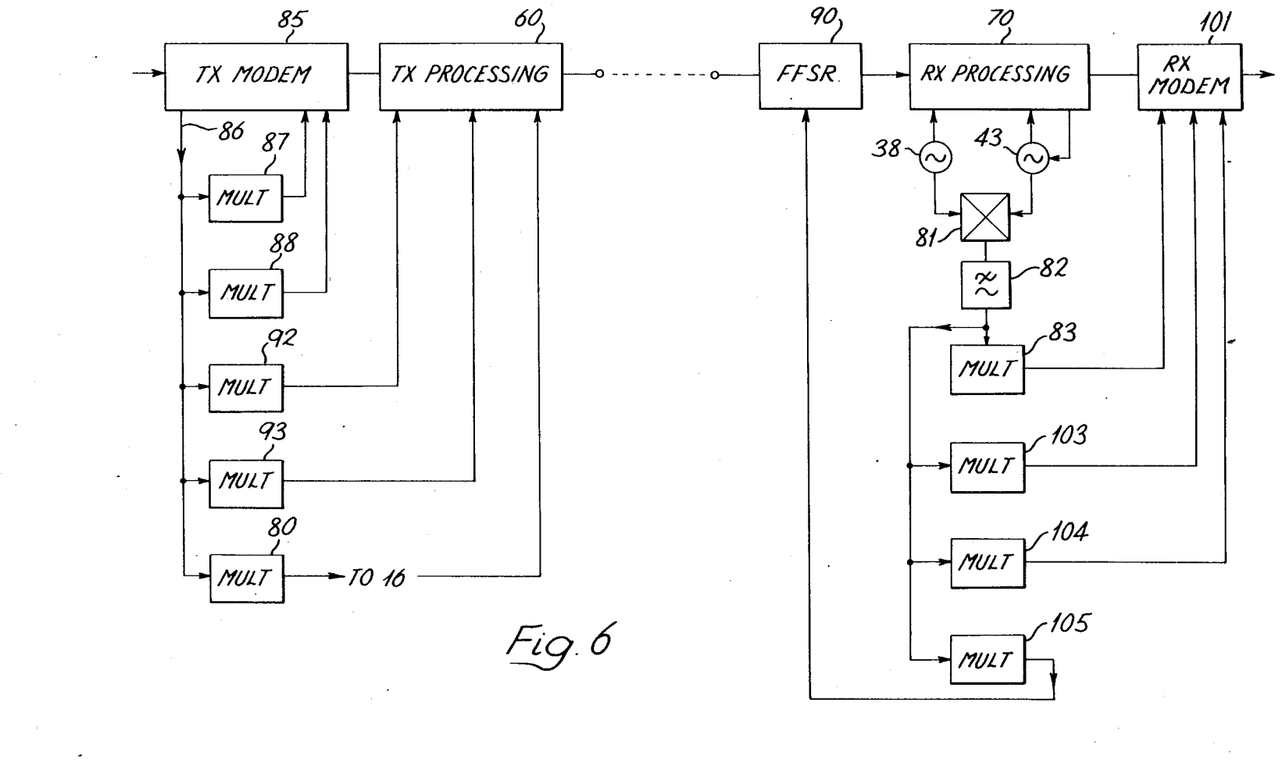
FIG. 6 is a block diagram of a TTIB system according to the invention having flexible data rate and carrier frequency.

Various forms of TTIB system are first described with reference to FIGS. 1 to 4 and then the embodiments of the invention which are shown in FIGS. 5 and 6 are explained.

Figure 1:
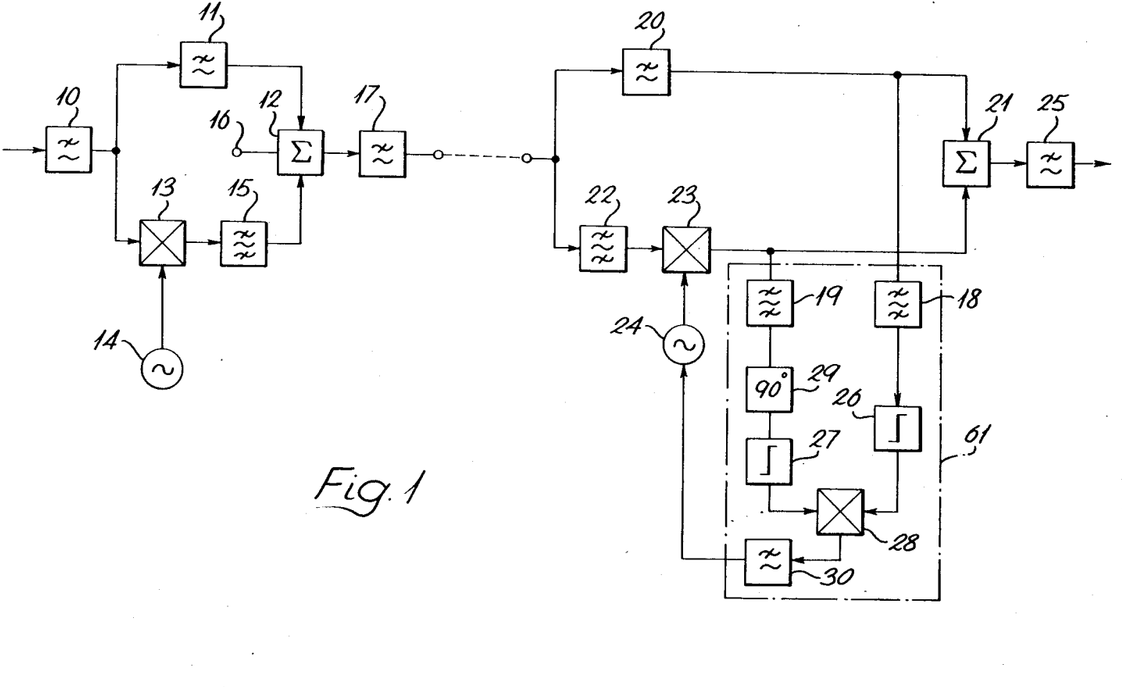
FIG. 1 is a block diagram of a first TTIB system.

In FIG. 1 which relates to a simple form of TTIB, a baseband signal is applied to a low-pass filter 10 to remove any high frequency components outside the band which may be present. At the output of the filter 10 the signal is passed to a further low-pass filter 11 which selects a low frequency portion of the band for application to a combining circuit 12. The output of the filter 10 is also applied to a mixer 13 receiving an additional signal from an oscillator 14 at a frequency equal to the required notch width. The upper sideband of the output of the modulator 13 is selected using a bandpass filter 15 and applied to the combining circuit 12. A tone, tyically an SSB pilot tone, may, where required, be supplied to a terminal 16 of the combining circuit. The composite signal so produced is passed through another low-pass filter 17 to ensure that no signals outside the required band remain and it is then transmitted, using, for example, an SSB transmitter, over mobile radio to a receiver where any pilot tone is first extracted using a bandpass filter (not shown) for use in pilot-based correction of the SSB signal. After such demodulation a signal comprising the lower band, the notch, a possible reference tone and the upper band is applied to a low-pass filter 20 where the lower band is extracted and applied to a combining circuit 21. A bandpass filter 22 separates the upper band and applies it to a mixer 23 receiving signals from a local oscillator 24 which restores the upper band to its original place in the spectrum so that when combined with the lower portion in the first combining circuit 21 the original baseband is restored. A low-pass filter 25 ensures that no spurious frequencies outside the baseband are passed to output.

The TTIB system described so far with its unlocked local oscillator 24 in the receiver is satisfactory for normal analogue voice communication but not for conventional data transmission systems such as frequency shift keying (FSK) and differential phase shift keying (DPSK).

In order to overcome this problem it is necessary to lock together the frequency and phase of the transmitter and receiver translation oscillators; this has the effect of ensuring phase integrity in the restored band at the output of a combining circuit 21. See the paper "Phase-Locked Transparent Tone-In-Band (TTIB): A new spectrum Configuration Particularly Suited to the Transmission of Data Over SSB Mobile Radio Networks" by J. P. McGeehan and A. J. Bateman, IEEE Transactions on Communications, COM-32, No. 1, January 1984, pp 81–87.

Control for the local oscillator 24 is derived by taking the signals from the lower and upper portions of the band after restoration and applying these signals by way of bandpass filters 18 and 19, and limiters 26 and 27 to a phase sensitive detector 28, the phase of the signal of the upper portion of the band being changed by 90° in a circuit 29 before application to the detector 28. The ouput of the detector 28 passes by way of a low-pass filter 30 before being applied as a control signal for the oscillator 24. The circuits 18, 19, 23, 24 and 26 to 30 form part of a phase locked loop and the filter 30 determines the order and type of the loop.

The control for the oscillator 24 depends on the outputs of the filters 20 and 22 containing signals in the transition region at the edges of the ntoch which should nominally be at the same frequency and phase after restoration of the upper portion. Detection of frequency and phase differences in these signals by the detector 28 provides the control signal for the oscillator 24. These signals may be up to 40 to 50 dB below the passbands of the filters. The filters 18 and 19 have passbands of typically 200 Hz and since the upper portion has been restored in frequency at the output of the mixer 23 both of the filters 18 and 19 are centred on the transition region at the lower edge of the notch. The filters 18 and 19 and the limiters 26 and 27 may sometimes be omitted. If necessary the filter 30 is given a frequency characteristic which depends on the roll-off of the filters 20 and 22.

In the following more detailed description of the operation of FIG. 1, it is assumed that the appropriate time delays in all paths are matched, and that the input signal to the filter 10 is represented by $$y_A(t) = \alpha \cos(\omega_s t + \beta)$$

where $\alpha$ and $\beta$ represent the amplitude and phase terms, respectively, of a signal frequency component centred at $\omega_s$, where $\omega_s$ is within the transition region between the upper and lower bands.

This signal is then in turn mixed with the frequency translating carrier, $\omega_1$, generated by the oscillator 14 and expressed as:

$$y_B(t) = \cos(\omega_1 t + \psi)$$

where $\psi$ is an arbitrary phase term. The resulting summed and filtered output of the transmitter processing at the output of the filter 17 is then $$y_C(t) = A_1 \alpha \cos(\omega_s t + \beta) + A_2 \alpha \cos\{(\omega_s + \omega_1)t + \beta + \psi\}|_{t \to t - D_1 - D_2}$$

where $A_1$ $A_2$ represent the attenuation coefficients of the filters 11 and 15, respectively, $t \to t - D_1 - D_2$ means replace t by $t - D_1 - D_2$, $D_1$ is the delay of the filter 10, and $D_2$ is the delay of the filters 11 and 15.

On reception in a mobile environment for example, the signal is assumed corrupted by both random amplitude and phase modulation, $r(t)$ and $\phi(t)$, and, after demodulation, has a residual frequency offset error of $\Delta\omega$, due to oscillator drift. The input to the receiver processing at the filters 20 and 22 can then be written as $$y_D(t) = A_1 r(t)\alpha \cos\{\omega_s t + \beta + \phi(t) + \Delta\omega t\} + A_2 r(t)$$

$$\cdot \alpha \cos\{(\omega_s + \omega_1)t + \beta + \psi + \phi(t)$$

$$+ \Delta\omega t\}|_{t \to t - D_1 - D_2}$$

If the free-running centre frequency of the voltage controlled oscillator (VCO) 24 is expressed as $$Y_s(t) = \cos(\omega_2 t + \delta)$$

where $\delta$ is an arbitrary phase term, then the two input signals to the summing circuit 21 are given by $$y_E(t) = A_3 A_1 r(t)\alpha \cos\{\omega_s t + \beta + \phi(t) + \Delta\omega t\}|_{t \to t - D_1 - D_2 - D_3}$$

and $$y_F(t) = A_4 A_2 r(t)\alpha \cos\{(\omega_s + \omega_1 - \omega_2)t + \beta + \phi(t)$$

$$+ (\psi - \delta) + \Delta\omega t - \omega_2(D_1 + D_2 + D_3)\}|_{t \to t - D_1 - D_2 - D_3}$$

+ components at $(\omega_s + \omega_1 + \omega_2)$ where it is assumed that the passbands of the filters 20 and 22 are sufficiently wide to pass the input signal without distortion except for a constant attenuation $A_3$, $A_4$ and time delay $D_3$.

For satisfactory combining of these two signals defined, the frequency and phase of the oscillator 25 must be adjusted such that $$(\omega_1 - \omega_2) = 0, \text{ and } (\psi - \delta) - \omega_2(D_1 + D_2 + D_3) = 0 \quad \text{equation 1}$$

After filtering to remove the "2f" components from the mixer processing and to improve the signal-to-noise ratio of the signals being fed into the limiters, the two signals are mixed and filtered to obtain the difference term $y_1(t)$, which is used to control the oscillator 24.

The bandpass filters and limiters are included in the circuit to extract the frequency components in the sub-band overlap region and to remove the effects of envelope fading and speech modulation so that the input to the double balanced mixer and the loop gain, K, are held constant. In some circumstances it can be advantageous to exclude the limiters to reduce the noise sensitivity of the system. The resulting difference term is given by $$y_i(t) = k \sin \{(\omega_1 - \omega_2)t + \psi - \delta - \Omega_2$$

$$\cdot (D_1 + D_2 + D_3)\}|_{t \to t - D_1 - D_2 - D_3}$$

which is independent of the multipath induced fading, containing only the required information concerning the frequency and phase error between the transmitter and receiver translating oscillators, and phase shifts introduced by the transmission link. This signal is used to modify the frequency and phase of the oscillator 24 such that the frequency error is eliminated and the phase error minimised.

Figure 2:
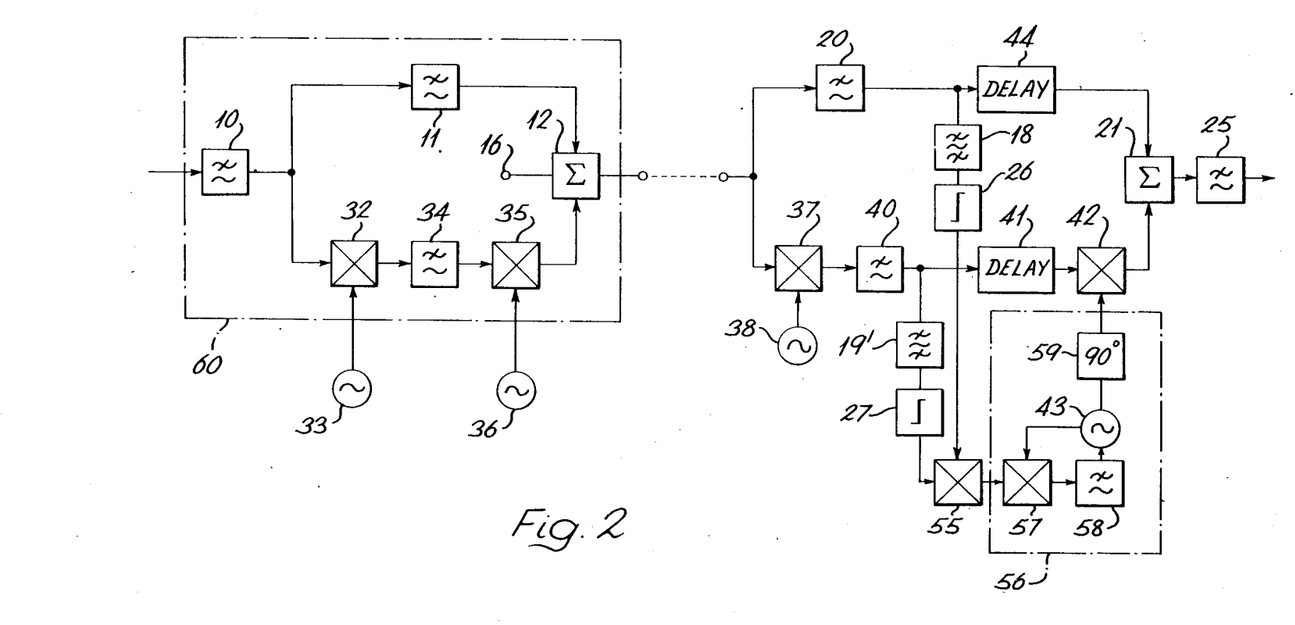
FIG. 2 is a block diagram of a second TTIB system.

Inherent in the application of feedback phase lock techniques for correct sub-band recombination is a small but finite time delay in which correction of the local oscillator 24 is achieved. Standard acquisition aids can be applied here to advantage. The inherent delay may cause temporary errors while correction is applied but this problem can be overcome using a feedforward technique in a way which will now be described with reference to FIG. 2 but by way of illustration another form of TTIB is employed in the transmitter and receiver. In FIG. 2 as in FIGS. 3 and 4 component circuits which have the same function as in an earlier Figure or Figures have the same designations and are not further described.

In FIG. 2, the output from the low pass filter 10 is applied to a mixer 32 which also receives a signal from an oscillator 33 so that the whole baseband is moved up in frequency as a result of mixing. The lower portion of the lower sideband of the resultant signal now corresponds to the upper portion of the baseband signal and this upper portion from the mixer 32 is removed using a low-pass filter 34. The resulting signal corresponding to the upper portion of the baseband, but reversed in frequency, is applied to a further mixer 35 receiving another signal from an oscillator 36 and the resultant signal is applied to the combining circuit 12. This arrangement is flexible in terms of notch width since the notch width equals the frequency of the oscillator 36 minus that of the oscillator 33. Such a transmitter is described in the 1984 paper by McGeehan and Bateman where FIG. 2 illustrates the frequency translations used.

Assuming SSB transmission, the receiver signal obtained, after SSB demodulation using the pilot tone, is applied to a mixer 37 also coupled to an oscillator 38. The upper portion of the original received signal now forms part of the lower sideband of the output from the mixer 37 and the whole of this output except the said upper portion is removed by means of a low-pass filter 40 and then applied by way of a delay circuit 41 to another mixer 42 coupled to an oscillator 43. The lower portion of the baseband signal available at the output of the low-pass filter 20 is passed through a delay circuit 44 before it is reunited with the upper portion in the combining circuit 21. The delays of the circuits 41 and 44 are such that parts of the upper and lower portions which correspond in time arrive at the combining circuit 21 at the same time.

In order to achieve phase coherency the output signals of the low-phase filters 20 and 40 are applied via bandpass filters 18 and 19' and limiters 26 and 27 to a mixer 55 the output of which is nominally the corrected signal required by the mixer 42. The output of the mixer 55 may be passed (as shown) to a phase locked loop (PLL) 56 comprising the oscillator 43, a mixer 57 and a low-pass filter 58. The oscillator output is fed via a 90° phase-shift circuit 59 to the mixer 42. The PLL functions to provide a signal for the mixer 42 when the mixer 55 has no input signals, for example on start up, and to clean up the output from the mixer 55 for example by removing amplitude variations.

By taking output signals from the filters 20 and 40 before the delay circuits 41 and 44 and using these signals to derive a signal to correct the frequency of the oscillator 43, this correction can be provided for the whole of any input signal to the receiver including the initial portion, at the expense of delaying the output signal by the interval imparted by the delays of the circuits 41 and 44, this interval being chosen to be sufficient for such correction to be carried out. However if an initial error in each package of signals passed through the system can be tolerated the delay circuits 41 and 44 may be omitted. Often each package is preceded by a redundant preamble to allow control loops to settle but by using the delays this preamble can be omitted with a consequent increase in traffic capacity.

Since the output of the filter 40 has not been translated to its original position in the frequency spectrum, the passband of the filter 19' is centred on the transition region of the upper band segment at the edge of the notch.

The circuits 43, 57, 58 and 59 can be regarded as selecting a frequency nominally equal to the frequency of the oscillator 36 from the output of the mixer 55 which is nominally at this frequency and for this reason these circuits may be replaced by a bandpass filter or even omitted so that the output of the mixer 55 is connected directly to the mixer 42. An averaging filter (not shown) may be inserted between the mixers 55 and 57 when the cut-off frequency of the filter 58 can be lowered.

The delays imparted by the circuits 41 and 44 depend on the delay occurring in the PLL 56 which depends on the position of the cut-off frequency of the filter 58 and may be a few microseconds to several milliseconds. Where an averaging filter is positioned between the mixers 55 and 57, the delay is mainly due to this filter. The delay circuits 41 and 44 may be CCD delay lines, or where the receiver is implemented by a computer, such as a microprocessor, by delaying appropriate variables by a number of operating cycles as required. The delay require can be measured and/or estimated from the properties of the filters used and of the PLL, or found empirically.

In some circumstances it is thought possible that the input signals for the filters 18 and 19' may be taken from the inputs of the filters 20 and 40 instead of their outputs. As in FIG. 1, there are arrangements in which the filters 18 and 19' and the limiters 26 and 27 can be omitted.

Making the same assumptions as were made for FIG. 1, but omitting the phase term $\alpha$, the arbitrary phase terms $\beta$, $\psi$ and random amplitude modulation $r(t)$, the input signal to the receiver combining circuit is $$A_1 \cos(\omega_s t + \phi(t) + \Delta\omega t) + A_2(\omega_2 t + (T_2-T_1)t + \phi(t) + \Delta\omega t)$$

where $T_1$ and $T_2$ are the frequencies of the oscillators 33 and 36, respectively.

The output from the filter 20 is $$A_3 A_1 \cos(\omega_s t + \phi(t) + \Delta\omega t)$$

and that from the filter 40 is $$A_4 A_2 \cos(R_1 t - \omega_s t - (T_2-T_1)t - \phi(t) - \Delta\omega t)$$

where $R_1$ is the frequency of the oscillator 38.

Thus the sum term output signal from the mixer 55 is $$A_3 A_4 A_1 A_2 \cos(R_1 t - (T_2-T_1)t)$$

The PLL 56 comprising the components 43, 57 and 58 causes the frequency $R_2$ of the oscillator 43 to be given by $$R_2 = R_1 - (T_2 - T_1)$$

that is $$R_2 - R_1 = T_1 - T_2 \qquad \text{equation 2}$$

Hence the output of the mixer 42 is $$A_4 A_2 \cos(\omega_s t + \phi(t) + \Delta\omega t)$$

which is combined with the output of the filter 20 to give the baseband signal assuming the delays imparted by the circuits 41 and 44 are equal.

The feedforward technique shown in FIG. 2 can equally be applied to the circuit of FIG. 1 by taking the signals from the output of the filters 20 and 22 and applying them to the filters 18 and 19. Delays may be introduced following the filters 20 and 22. A further mixer is however necessary in order to restore the frequency of the input to filter 19 to its original place in the frequency spectrum. Alternatively the oscillator 24 can be omitted and the output of the filter 30 can be passed to the mixer 23.

Where a data stream is to be transmitted in mobile radio SSB the need to obtain bit synchronisation in a receiver modem arises. The required clock timing signal is required to be independent of both random phase fluctuations and demodulation frequency error. Such a signal can be obtained from the arrangement shown in FIG. 3 where a data input is applied to a transmitter modem 62 and then to the TTIB transmitter processor which is the same as that of FIG. 2 and is designated 60 in both FIG. 2 and FIG. 3. The clock frequency for the modem is derived from the signals of oscillators 33 and 36 which play the same part in TTIB processing as they do in the arrangement of FIG. 2. The output of the oscillators 33 and 36 is applied to a mixer 63 which derives an output signal having a frequency equal to the difference frequency of its input signals and the output of this mixer after multiplication in a multiplier 64 is applied as the clock signal for the modem 62.

After transmission by any convenient means and demodulation the signal containing data is applied to a low-pass filter 20 as in FIGS. 1 and 2. The receiver input signal is also applied to the circuit branch comprising the mixers 37 and 42 and the low-pass filter 40. This arrangement is the same as shown in FIG. 2 except that since feedback control is used in this example the delay 41 is omitted. The oscillator 42 is controlled by an oscillator control circuit 61 which is the same as that indicated by the designation 61 and the dotted line in FIG. 1. The output signal of the low-pass filter 25 is applied to a receiver modem 65 which generates the data output. The clock frequency for the modem 65 is derived from the oscillators 38 and 43 by passing their output signals to a mixer 66 which derives a signal having a frequency which equals the difference between the frequencies of the oscillators 38 and 43. The output of the mixer 66 is connected by way of an adjustable phase shift circuit 67 and a multiplier 68 to the input clock terminal of the modem 65. The multipliers 64 and 68 multiply the output frequencies of the mixers 63 and 66, respectively, by a convenient factor N to provide a suitable clock frequency.

As a brief explanation of the operation of FIG. 3 the output signal of the oscillator 43 can be regarded as being locked in frequency and phase by the phase sensitive detector 61 to a predetermined relationship with the oscillator 38, this relationship being the same as that between the output signals of the oscillators 33 and 36 in the transmitter. Hence the difference frequencies of the transmitter oscillators and the receiver oscillators can be used to derive the modem clock signals.

In FIG. 3 the clock signal supplied to the modem 62 is $$e_t(t) = N \cos((T_2-T_1)t + \psi_{T2} - \psi_{T1}) \qquad \text{equation 3}$$

where N is the multiplication factor of the multiplier circuits 64 and 68

$\psi_{T1}$, $\psi_{T2}$ are the phases of the oscillators 33 and 36, and ideally this signal $e_t(t)$ should also be supplied as the clock signal for the modem 65 after it has suffered the same delays as the output signal of the modem 62.

The clock signal for the modem 65 is given by $$e_r(t) = N \cos\{(R_1-R_2)t + \psi_{R1} - \psi_{R2}\}$$

where $\psi_{R1}$, $\psi_{RR2}$ are the phases of the oscillators 38 and 43.

Since, in view of the operaion of the PSD 61, $T_2 - T_1 + R_2 - R_1 = 0$ (see equation 2) and, as can be shown for a phase locked TTIB system, the phase tracking error $\psi_e$ at the output of the combining circuit 25 is $$\psi_e = \psi_{T2} - \psi_{T1} + \psi_{R2} - \psi_{R1} - T_1(D_0+D_1) - R_1(D_0+D_1+D_2)$$

$$+ R_2(D_0+D_1+D_2+D_3) \qquad \text{equation 4}$$

where $D_0$, $D_1$, $D_3$, are the delays of filters 10, 11 and 34, and 20 and 40, and $D_2$ is the variable time delay due to transmitter and receiver RF/IF processing and propagation delay.

Using equations 2 and 4 the expression for $e_r(t)$ can therefore be rewritten as follows $$e_r(t) = N \cos((T_2-T_1)t + \psi_{T2} - \psi_{T1} - T_1 D_0 + T_2(D_0+D_1)$$

$$- R_1(D_0+D_2+D_3) + R_2(D_0+D_1+D_2+D_3) - \psi_e) \qquad \text{equation 5}$$

Any error in the required clock signal for the modem 65 is found by taking equation 1 modified by the delays $D_0$, $D_1$, $D_2$, $D_3$, and $D_4$ (where $D_4$ is the delay due to the filter 25) from the above expression for $e_j(t)$, with the result that the difference in frequency $\delta\omega$, and phase $\delta\psi$ between the desired and received data clock is $$\delta\psi + \delta\omega = N(\psi_e - (T_2 - T_1)(D_0 + D_4) - T_2D_2 + R_2D_3)$$

Hence there is no frequency error and the phase error is independent of the variable system delay $D_2$ and can be compensated by the fixed phase shift 67 when correctly adjusted in the receiver clock path. The only residual error is the loop phase tracking error $\psi_e$ and by using narrowband tracking loops, this error can be made arbitrarily small.

The principle of operation of the circuit of FIG. 3 can be applied to that of FIG. 1 so that a transmit modem connected at the input of the filter 10 receives its clock signal from a multiplier connected to the oscillator 14 and in the receiver a receive modem connected at the output of the filter 25 receives its clock signal from the oscillator 24 by way of an adjustable delay circuit and a further multiplier.

Where clock signals for modems are provided in the way described, the feedforward technique of FIG. 2 may also be used; that is for example the technique can be applied to the arrangement of FIG. 3 by and addition of delays 41 and 44 and the mixer 55.

The TTIB FFSR system described in the 1982 paper by McGeehan, Bateman and Burrows reduces that frequency uncertainty between transmitter and receiver local oscillators which results in frequency error in the demodulated baseband signal. Where coherent demodulation is required for example in data transmission the remaining frequency error is still, though small, important. To provide coherent demodulation within, for example modems designed to make use of TTIB FFSR, the arrangement shown in FIG. 4 can be employed. The baseband input is applied to the TTIB transmitter processing circuit 60 and a control tone which is inserted in the notch is derived from the difference frequency of the output signals of the oscillators 33 and 36 which are applied as in FIG. 3 to a mixer 63. After multiplication in a multipler circuit 71 to a convenient frequency the output of the mixer 63 is applied to the terminal 16 (see FIG. 2) for insertion in the notch.

At the receiver, envelope and phase differences between the baseband input signal at the transmitter and that derived by the receiver are corrected by an FFSR circuit 73 connected at the input to a TTIB receiver processing circuit 70 wich is as shown by the same designation in FIG. 3. The FFSR circuit 73 is as shown in FIG. 5 of the 1982 paper by McGeehan, Bateman and Burrows except that the local oscillator having an output frequency of $\omega_2$ shown in FIG. 5 is replaced by a signal derived from the output signals of the oscillators 38 and 43. These output signals are applied to the mixer 66 which derives the difference frequency. The output of the mixer 66 is connected to a multiplier circuit 74 which provides the required signal to replace $\omega_2$. Multipliers 71 and 74 both multiply by the same convenient factor N.

From the 1982 paper it will be apparent that the signal $y_e(t)$ at the output of the FFSR circuit 73 is $$y_e(t) = A_1 \alpha \cos (\omega_s t + \beta + \delta\omega_k t + \delta\psi_k)$$

$$+ A_2 \alpha \cos (T_2 - T_1 + \omega_s)t + \beta + (T_2 - T_1)D_0$$

$$+ \delta\omega_k t + \delta\psi_k + T_2D_1)$$

where $\delta\omega_k$, $\delta\psi_k$ = frequency and phase difference between the FFSR local oscillator (that is the output signal of the multiplier circuit 74) and the delay transmitted tone (that is as originating through application to the terminal 16).

The local oscillator input is given by equation 5 and the corresponding delayed transmitted reference signal $y_1(t)$ is $$Y_1(t) = \cos N((T_2 - T_1)(t - D_2) + \psi_{T2} - \psi_{T1}) \quad \text{equation 6.}$$

Thus from equations 5 and 6, the difference frequency and phase between the transmitted reference and the local FFSR reference superimposed upon the baseband output signal is given by $$\delta\omega_k + \delta\psi_k = N(\psi_e - T_1D_1 - R_2T_3).$$

Hence demodulation frequency error is eliminated and the phase error $\delta\psi_k$ is independent of the time delay $D_2$ and can therefore be compensated by an adjustable phase shift circuit 75 connected between the multiplier 74 and the FFSR circuit 73. Consequently coherent demodulation of the received signal is achieved.

Again it will be appreciated that the FFSR correction technique can be applied to a circuit of the type shown in FIG. 1 by multiplying the output frequency of the oscillator 14 and applying it to the terminal 16 as a signal in the notch. At the receiver the output signal from the oscillator 24 is multiplied by the same amount and applied to an FFSR correction circuit connected at the input to the filters 20 and 22. In addition the feedforward technique of FIG. 2 can be applied to FIG. 4 or FIG. 1 when modified to employ FFSR.

A first embodiment of the invention which will now be described with reference to FIG. 5 has as its object the transmission of data from a modem by SSB, typically by mobile radio where fading occurs. As has been mentioned different types of modems send data at different rates and even when the rates of modems are nominally the same significant differences occur. For this reason a system is needed which is able to adapt itself automatically to a required data rate. Such a system is shown in FIG. 5 where an input system terminal 69 for the connection of the output of a transmit modem is provided and a clock signal from the modem representative of data rate is applied to a terminal 91. The system of FIG. 5 employs two mixers 32 and 35 and in this respect is similar to FIG. 2 but although it would be possible to use the feedforward receiver control system of FIG. 2, in this example the feedback control system based on the contents of the control circuit 61 of FIG. 1 is used.

The transmitter oscillators 33 and 36 of FIG. 2 are replaced by multiplier circuits 92 and 93 so that the position of the TTIB notch in the frequency spectrum and its width are controlled by signals from these multipliers. The multiplier 92, which is a known circuit for multiplying an input frequency by a fraction M/N comprises two frequency dividers 94 and 95 which divide by the positive integers N and M respectively, a mixer 96, which receives inputs from the dividers 94 and 95 and an oscillator 97 which receives a frequency control signal proportional to the lower sideband of the output of the mixer 96, applied to the oscillator by way of a lowpass filter 98. The multiplier 93 is similar to the multiplier 92 except that N and M have different values. As the data rate and repetition frequency of the clock signal applied to the terminal 91 vary the notch width imparted by the mixers 32 and 35 also varies so that notch width is dependent on data rate.

In order to generate the reference tone required for SSB another multiplier 80 is coupled between the clock input terminal 91 and the terminal 16 of the combining circuit 12. Again the reference tone varies with data rate.

An alternative multiplier circuit for each of the multipliers 92, 93 and 98 which is often advantageous comprises a non-linear circuit for generating harmonics of the clock signal appearing at the terminal 91 followed by a bandpass filter or phase locked loop for selecting the frequencies required for the mixers 32 and 35, and the terminal 16. This approach has the advantage that no phase ambiguity is introduced into the multiplier output signal since no division is performed in the circuit (the dividers 94 and 95 may introduce some phase ambiguity).

In the receiver notch width is determined by applying the output signals of the oscillators 38 and 43 to a mixer 81 and selecting the lower sideband using a lowpass filter 82. Since the output of the filter 82 is equal to the difference between the frequencies from the oscillators 38 and 43 it is equal to the notch width. By using a multiplier 83 which is similar to the multiplier 72 but has values of N and M which are reciprocals of the values used in the oscillator 82 the original clock frequency is recovered and made available at the terminal 84 where it can be applied to a receive modem coupled to the output of the filter 25. The SSB reference tone is used in those circuits in the SSB receiver which provide output signals to the filter 20 and the mixer 37.

The invention also finds application in systems other than SSB and mobile radio where fading is not a problem and no reference tone is required. Again a variable data rate system is provided using TTIB with variable notch width to control a receiver clock signal but the notch is used to accommodate an independent in-band signalling system. All the other advantages of modified TTIB systems, i.e. coherent demodulation, simple carrier and bit synchronisation, are also available. The main advantage of using an in-band system instead of adding a further band at the top of the frequency spectrum is that at high frequencies such an additional band may suffer from distortion and attenuation which is not usually important at the high end of a baseband but will prevent a separate signallying system operating well. Furthermore the insertion of an independent signalling system at the bottom of a frequency spectrum (that is below 300 Hz) is difficult because it requires filters with high roll-off at low frequencies.

The arrangement shown in FIG. 5 can be modified to operate with a single oscillator as in FIG. 1 since the frequency of the oscillator controls the width of the notch.

PSK has good error performance in white noise but becomes significantly worse than DPSK in fading conditions such as are experienced in local radio SSB. However the present invention allows coherent PSK to be used in such situations. In the paper entitled "Data transmission over UHF fading mobile radio channels" by Bateman and McGeehan, published in the IEE Proceedings Part F volume 131, July 1984, pages 364 to 374 the last part of Section 2 contains equations 16, 17 and 18 which show that in TTIB the data carrier and the SSB reference tone have to be identical in frequency. This restriction no longer applies when the present invention is used as shown in FIG. 6 since the two carrier signals required at the receiver for demodulation can be synthesised in both the correct frequency and phase. The advantages of variable data rate provided by FIG. 5 are retained.

In FIG. 6, data is applied to an PSK transmitter modem 85 which produces a clock signal at an output connection 86 dependent on the data rate. This signal is applied to the multipliers 92 and 93 to control the notch width in the same way as in FIG. 5 and it may also be applied to multipliers 87 and 88 to generate carrier frequencies for the modem but such carrier frequencies are usually provided by the modem internally. As before a multiplier 80 provides a reference tone at the terminal 16 in the data processing circuits shown within the box 60 in FIGS. 2 and 5.

At the receiver the incoming signals are first applied to an FFSR circuit 90 which removes any residual phase error in the same way as described in connection with FIG. 4. Hence the term $\Delta\omega_e t$ of equations 16 to 18 disappears and the notch width can be used to derive more than one carrier reference signal simply by multiplying the signal derived by the mixer 81 from the notch width. Thus in addition to the multiplier 83 which supplies the clock signal to a receiver modem 101 two multipliers 102 and 103 provide carrier reference signals for coherent demodulation of PSK signals in the modem 101. A multiplier 105 generates the reference signal required for the FFSR circuit 90 at the same frequency as is injected into the notch by the multiplier 80. Thus, the SSB reference signal in addition to enabling the SSB signal to be demodulated before application to the circuit 90 also allows the FFSR circuit to function when the signal from the multiplier 105 is supplied thereto.

Thus the circuit of FIG. 6 provides an arrangement with simultaneous data clock (that is variable data rate) and data synchronisation allowing coherent demodulation.

The multipliers 87 and 88 may for example be of either configuration mentioned above.

It will be apparent that the invention can be put into practice in many different ways from those specifically described and in particular it is now usually more convenient to carry out processing digitally rather than in analogue form. Thus the transmitters and receivers mentioned above may be replaced by computers, typically microprocessors or specially designed integrated circuits or sets of such circuits, or customised logic arrays.

Figure 7:
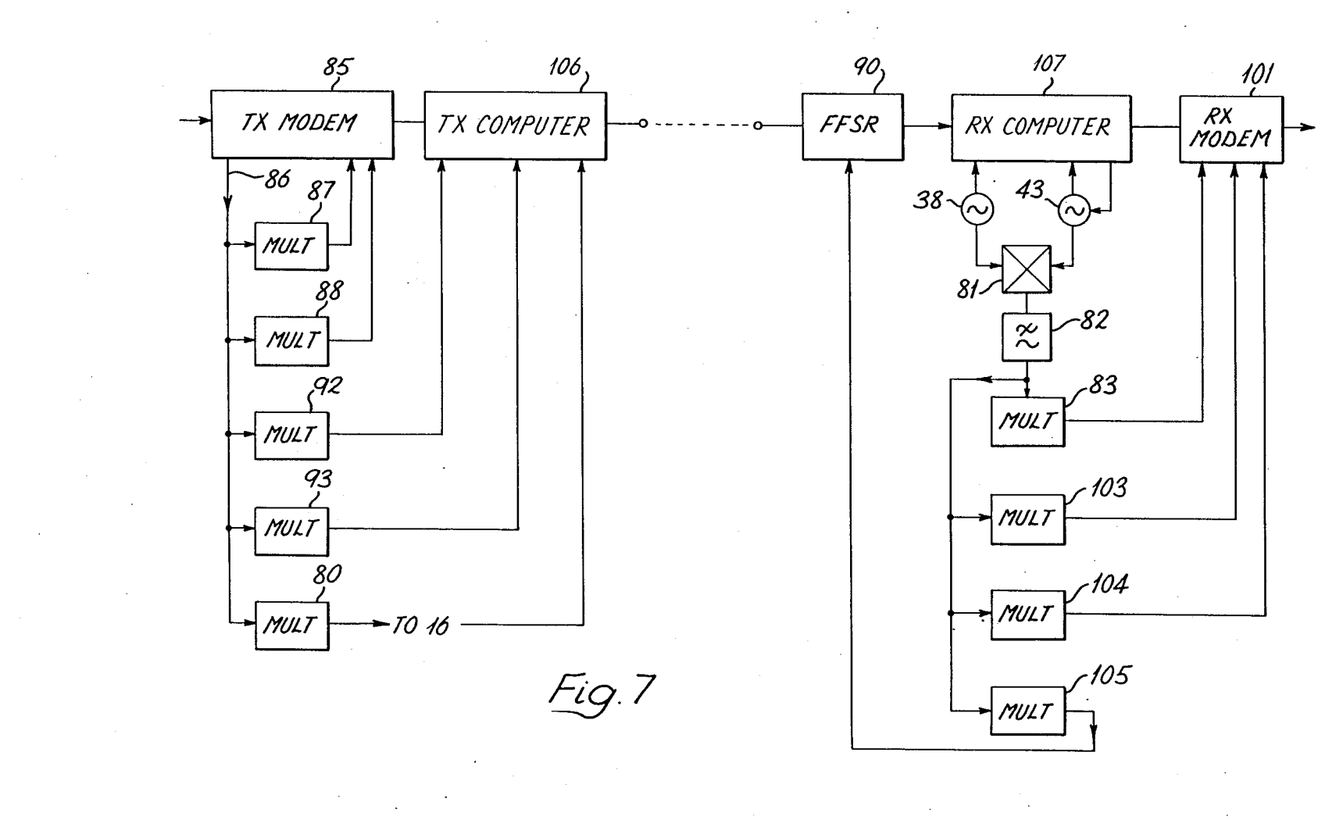
FIG. 7 is a block diagram of a TTIB system which uses a computer as the transmitter and receiver.

As an example, FIG. 7 shows an arrangement which is functionally similar to FIG. 6 in which the transmitter processor 20 is in the form of a computer 106, and the receiver processor 70 is in the form of a computer 107. FIGS. 1 to 6 and the accompanying description will be recognised as forming the basis of flow diagrams for allowing the programming of such computers without further description.

Further, data security can be incorporated into the system, firstly by the nature of the inherent band splitting process and secondly by variation of the notch width in accordance with, for example, a prearranged code.

We claim:

1. A communication system comprising:

a transmitter including: (a) means for dividing a frequency band to be transmitted into upper and lower portions with a frequency notch portion between said upper and lower portions by frequency translating at least a part of said frequency band which corresponds to one of said portions, and (b) control means, responsive to a control input signal, for varying the width of the notch portion; and a receiver comprising receiver processor means for restoring the original frequency spectrum, said receiver processor means including means for providing an output signal representative of the width of the notch portion.

2. A transmitter for a communication system including (a) means for dividing a frequency band to be transmitted into upper and lower portions with a frequency notch portion between said upper and lower portions by frequency translating at least a part of said frequency band which corresponds to one of said upper and lower portions, and (b) control means responsive to a control input signal for varying a frequency width of the notch portion, and wherein said means for dividing the frequency band to be transmitted includes first and second mixers for frequency translating at least a part of said frequency band, and filter means, coupled to said first and second mixers, and said control means is also for supplying reference input signals to said mixers, said reference input signals varying in accordance with the control input signal.

3. A transmitter according to claim 2 wherein said filter means is also for removing all frequencies from the output of the first mixer except a part of one side band which corresponds to said upper portion, and the second mixer is arranged to translate said part of said one side band to the final position from the upper portion in the frequency spectrum, and said filter means is also for removing the unwanted side band in the output of the second mixer and defining said lower portion.

4. A transmitter according to claim 1 including terminal means for receiving the control input signal and first and second frequency multipliers with inputs coupled to the said terminal means and outputs arranged to supply the reference input signals for the first and second mixers respectively.

5. A transmitter for a communication system including: (a) means for dividing a frequency band into upper and lower portions with a frequency notch portion between said upper and lower portions by frequency translating at least part of said band which corresponds to one of the said portions, and (b) control means, responsive to a control input signal, for varying the width of the notch portion, and wherein said means for dividing the band of interest includes means for filtering said frequency band, a mixer, coupled to said filter means for frequency translation of at least part of said frequency band, and the control means includes terminal means for the application of the control input signal, and a multiplier with an input coupled to said terminal means and an output terminal coupled to a reference input terminal of the mixer.

6. A transmitter according to claim 4 including a third frequency multiplier with an input connected to said terminal means and an output connected to inject the output signal into the notch portion.

7. A transmitter according to claim 5 including a second multiplier with input connected to said terminal means and an output connected to inject the output signal into the notch portion.

8. A receiver for a communication system having a transmitter which includes: (a) means for dividing a frequency band in the frequency spectrum into upper and lower portions with a frequency notch portion between said upper and lower portions by frequency translating at least part of said band which corresponds to one of said portions, and (b) control means, responsive to a control input signal, for varying the width of the notch portion the receiver including receiver processor means for restoring the original frequency spectrum, comprising:
(a) first and second receiver mixers for frequency translation of at least part of the band received;
(b) first filter means coupled to said first and second receiver mixers;
(c) first and second reference means for supplying reference input signals respectively to the receiver means;
(d) means for controlling one of said reference means to ensure that said upper and lower portions are restored in the correct relative frequency and phase in a restored frequency spectrum, and
(e) comparison means, coupled to said first and second reference means, for providing an output signal representative of a width of said notch portion width including comparison means for by comparing the frequencies of the reference input signals in the receiver to generate a signal representative of notch portion width.

9. A receiver according to claim 8 wherein said first filter means is coupled to the output of the first receiver mixer and is also for removing all frequencies from the output thereof except one part of one side band which corresponds to the upper portion, and wherein the second receiver mixer is arranged to translate said part of said one side band to the final position of the upper portion after restoration of the original spectrum.

10. A receiver according to claim 8 wherein the comparison means includes a third receiver mixer coupled to receive the first and second receiver reference input signals, second means for filtering the output of said third receiver mixer to produce a filtered output, and multiplier means, with an input coupled to said filtered output of said second filter means, for removing one side band thereof.

11. A receiver according to claim 9 wherein the comparison means includes a third receiver mixer coupled to receive the first and second receiver reference input signals, second means for filtering the output of said third receiver mixer to produce a filtered output, and multiplier means, with an input coupled to said filtered output of said second filter means, for removing one side band thereof.

12. A receiver for a communication system having a transmitter which includes means for dividing a frequency band in the frequency spectrum into upper and lower portions with a frequency notch portion between said upper and lower portions by frequency translating at least part of said band which corresponds to one of said upper and lower portions, including control means, responsive to a control input signal, for varying the width of the notch portion, wherein the receiver includes a receiver processor for restoring the original frequency spectrum, said receiver processor comprising:

a receiver mixer for frequency translating at least part of the band received;

filter means, coupled to said receiver mixer; and means, coupled to said band received, for providing an output signal representative of a width of the notch portion, including reference means for supplying a reference input signal to the receiver mixer, and means for controlling said reference means to ensure that said upper and lower portions are restored in the correct relative frequency and phase in the restored frequency spectrum, the reference input signal then being representative of notch portion width.

13. A communication system according to claim 1, wherein the transmitter comprises signal conversion means with an output coupled to said means for dividing said frequency band;

conversion frequency multiplier means for injecting a signal into said notch portion;

said conversion means including means for generating a clock signal coupled to an input of said conversion frequency multiplier means;

and the receiver comprises:

means for correcting frequency and phrase differences in the signal received by the receiver processor relative to the signal received by said means for dividing the frequency band of the transmitter;

receiver conversion means with an input coupled to receive the restored frequency spectrum, and a further multiplier means coupled to receive the output signal representative of notch portion width, and to supply a reference signal to the means for correcting frequency and phase differences.

14. A communication system according to claim 13 wherein the transmitter comprises at least one further conversion frequency multiplier means connected to receive the clock signal and to supply signals to the conversion means for use in processing, and the receiver comprises at least one other multiplier coupled to receive the output signal representative of notch width and to supply signals to the receiver conversion means for use in processing.

15. A communication system according to claim 1 wherein at least part of the transmitter and the receiver is formed by a programmed computer.

16. A method of transmitting and receiving signals comprising the steps of:

dividing a frequency band in the frequency spectrum into upper and lower portions with a variable width frequency notch portion between the upper and lower portions by frequency translating at least part of said band which corresponds to one of said upper and lower portions;

controlling the width of the notch portion in accordance with an input control signal;

transmitting the signal containing the variable width notch portion; and restoring the original frequency spectrum by a process which provides a signal representative of the width of the notch portion.

17. A communication system comprising:

a transmitter including: (a) means for causing a band of frequencies to carry information, means for dividing said band into upper and lower portions with a frequency notch portion between said upper and lower portions by frequency translating at least part of said band which corresponds to one of said portions, and (b) control means, responsive to a control input signal to vary the width of the notch portion, and a receiver comprising a receiver processor for recovering said information, said receiver processor including means for providing an output signal representative of the width of the notch portion.

18. A receiver for a communication system having a transmitter which includes means for causing a band of frequencies to carry information, means for dividing a band of interest in the frequency spectrum into upper and lower portions with a frequency notch portion between said upper and lower portions by frequency translating at least part of said band which corresponds to one of said portions, including control means responsive to a control input signal to vary the width of the notch portion, the receiver including a receiver processor for receiving said information, comprising:

first and second receiver mixer means for receiving received information;

filter means coupled to said first and second receiver mixer means for frequency translating at least part of the band received;

first and second reference means for supplying reference input signals to the receiver means, respectively;

means for controlling one of the reference means to ensure that the said upper and lower portions are in the correct relative frequency and phase when recovering said information; and means for providing an output signal representative of notch width, including comparison means for comparing the frequencies of the reference input signals in the receiver to generate a signal representative of notch width.

19. A receiver for a communication system having a transmitter which includes means for causing a band of frequencies to carry information, means for dividing a band of interest in the frequency spectrum into upper and lower portions with a frequency notch portion between said portions by a process which includes frequency translating at least part of said band which corresponds to one of said portions, including control means responsive to a control input signal to vary the width of the notch portion, wherein the receiver includes a receiver processor for recovering said information, comprising;

a receiver mixer for frequency translating at least part of the band received, filter means coupled to said receiver mixer, and means for providing an output signal representative of the width of the notch portion, including reference means for supplying a reference input signal to the receiver mixer, and means for controlling said reference means to ensure that, in recovering the said information, the said upper and lower portions are in the correct relative frequency and phase, the reference input signal then being representative of notch width.

20. A method of transmitting and receiving signals, comprising the steps of:

causing a band of frequencies to carry information;

dividing said band into upper and lower portions with a variable width frequency notch portion between the upper and lower portions by frequency translating at least part of said band which corresponds to one of said portions;

controlling the width of the notch portion in accordance with an input control signal;

transmitting the signal containing the variable width notch portion, receiving the transmitted signal;

processing the signal received to derive a signal representative of the width of the notch; and recovering said information.

* * * * *